(12) United States Patent
Tsai

(10) Patent No.: US 7,488,911 B2
(45) Date of Patent: Feb. 10, 2009

(54) COMPUTER WITH INTEGRATION TYPE SWITCH DEVICE

(75) Inventor: Hung-Chieh Tsai, Taipei Hsien (TW)

(73) Assignee: Aopen Inc., Taipei Hsien (TW)

( * ) Notice: Subject to any disclaimer, the term of this patent is extended or adjusted under 35 U.S.C. 154(b) by 282 days.

(21) Appl. No.: 11/607,695

(22) Filed: Nov. 30, 2006

(65) Prior Publication Data

US 2007/0227864 A1   Oct. 4, 2007

(30) Foreign Application Priority Data

Apr. 3, 2006   (TW) .............................. 95205581 U

(51) Int. Cl.
*H05K 7/00*   (2006.01)
(52) U.S. Cl. ..................... 200/330; 439/700; 361/752
(58) Field of Classification Search ......... 200/290–293, 200/308–315, 330–333; 439/64, 65, 700; 361/719, 748, 736, 752
See application file for complete search history.

(56) References Cited

U.S. PATENT DOCUMENTS

| | | | | |
|---|---|---|---|---|
| 4,354,077 A | * | 10/1982 | McMains et al. | ............ 200/314 |
| 6,081,207 A | * | 6/2000 | Batio | ........................... 341/20 |
| 6,531,669 B1 | * | 3/2003 | Miller et al. | ................ 200/313 |
| 7,147,484 B1 | * | 12/2006 | Kobayashi et al. | ............ 439/74 |
| 7,283,356 B2 | * | 10/2007 | Kobayashi et al. | .......... 361/684 |

* cited by examiner

*Primary Examiner*—Elvin G Enad
*Assistant Examiner*—Marina Fishman
(74) *Attorney, Agent, or Firm*—Schwabe, Williamson & Wyatt, P.C.

(57) ABSTRACT

A computer includes a main housing formed with a mounting hole, and a switch device aligned with the mounting hole. The switch device includes a base, a power supply circuit board disposed fixedly on the rear side of the base, a power supply switch disposed on the power supply circuit board, a pressing unit operable to activate the power supply switch, and an infrared receiver disposed fixedly on the base of the switch device for receiving infrared signals.

11 Claims, 4 Drawing Sheets

US 7,488,911 B2

COMPUTER WITH INTEGRATION TYPE SWITCH DEVICE

CROSS-REFERENCE TO RELATED APPLICATION

This application claims priority of Taiwanese Application No. 095205581, filed on Apr. 3, 2006.

BACKGROUND OF THE INVENTION

1. Field of the Invention

This invention relates to a computer, and more particularly to a computer having an integration type switch device.

2. Description of the Related Art

The current trend in electronic products is toward increased compactness and attractive design. However, a conventional computer housing is formed with a plurality of openings for receiving a power supply switch, signal indicating lights, an infrared receiver, etc., and for transmission of infrared light rays. Such electronic elements and openings are not concentrated at a single location. This results in an ugly appearance of the computer and difficulties during manufacture.

SUMMARY OF THE INVENTION

An object of this invention is to provide a computer that includes a power supply switch and an infrared receiver, which are integrated with each other.

Another object of this invention is to provide a computer that includes a main housing formed with a reduced number of openings.

According to this invention, a computer includes a main housing, a motherboard, an integration type switch device, a speaker unit, and a microphone. The main housing includes a front wall formed with a mounting hole therethrough.

The integration type switch device includes a base, a power supply circuit board, a power supply switch, a signal indicating light, a pressing unit, and an infrared receiver. The base has an annular surrounding wall disposed fixedly within the mounting hole in the main housing, two side wings extending respectively and laterally from two opposite sides of the surrounding wall away from each other, and two U-shaped positioning brackets spaced apart from each other and formed on a rear side of the surrounding wall.

The power supply circuit board is spaced apart from the mounting hole in the main housing, is disposed fixedly on and behind the positioning brackets of the base, and is coupled electrically to the motherboard. The power supply switch is disposed on a front side surface of the power supply circuit board. The signal indicating light is located under the power supply switch.

The pressing unit includes a transparent actuator plate and a transparent push plate, which are movable forwardly and rearwardly within the surrounding wall of the base, and two resilient members for biasing the actuator plate to move forwardly within the surrounding wall. The push plate is configured to permit the user to directly apply a force thereto. The actuator plate has a rear side surface formed with a control key. When a force is applied, the actuator plate is moved rearwardly relative to the base, and the control key comes into contact with and activates the power supply switch. When the force is released, the resilient members bias the actuator plate to return to its normal position. Each of the resilient members has two ends abutting respectively against the actuator plate and the corresponding positioning bracket.

The infrared receiver is coupled electrically to the motherboard, and has a receiver body disposed fixedly on a rear side of the base, and a hemispherical transparent light-detecting member disposed on a front side of the receiver body for receiving infrared signals. The actuator plate has a through hole formed therethrough. The light-detecting member extends into the through hole in the actuator plate.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
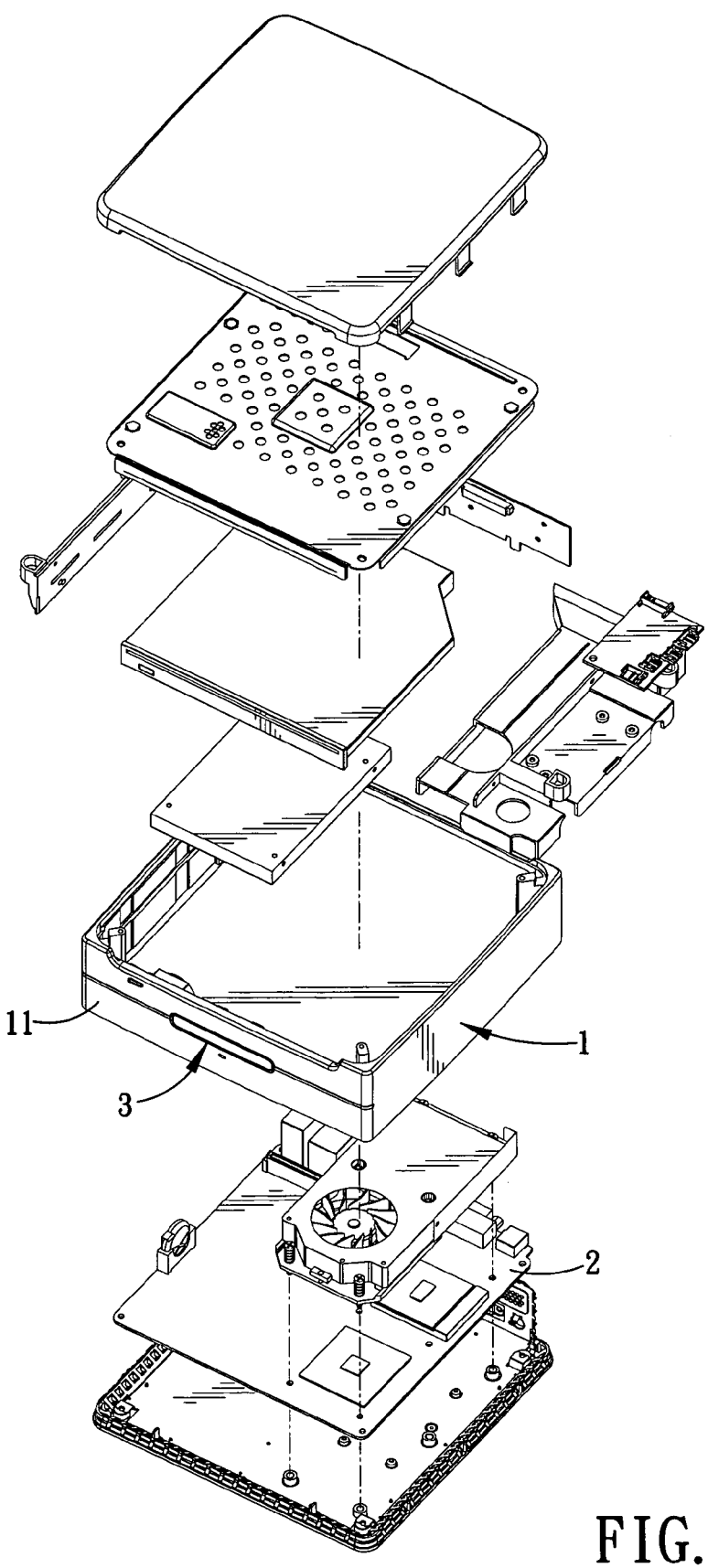
FIG. 1 is a partly exploded perspective view of the preferred embodiment of a computer according to this invention.
Figure 2:
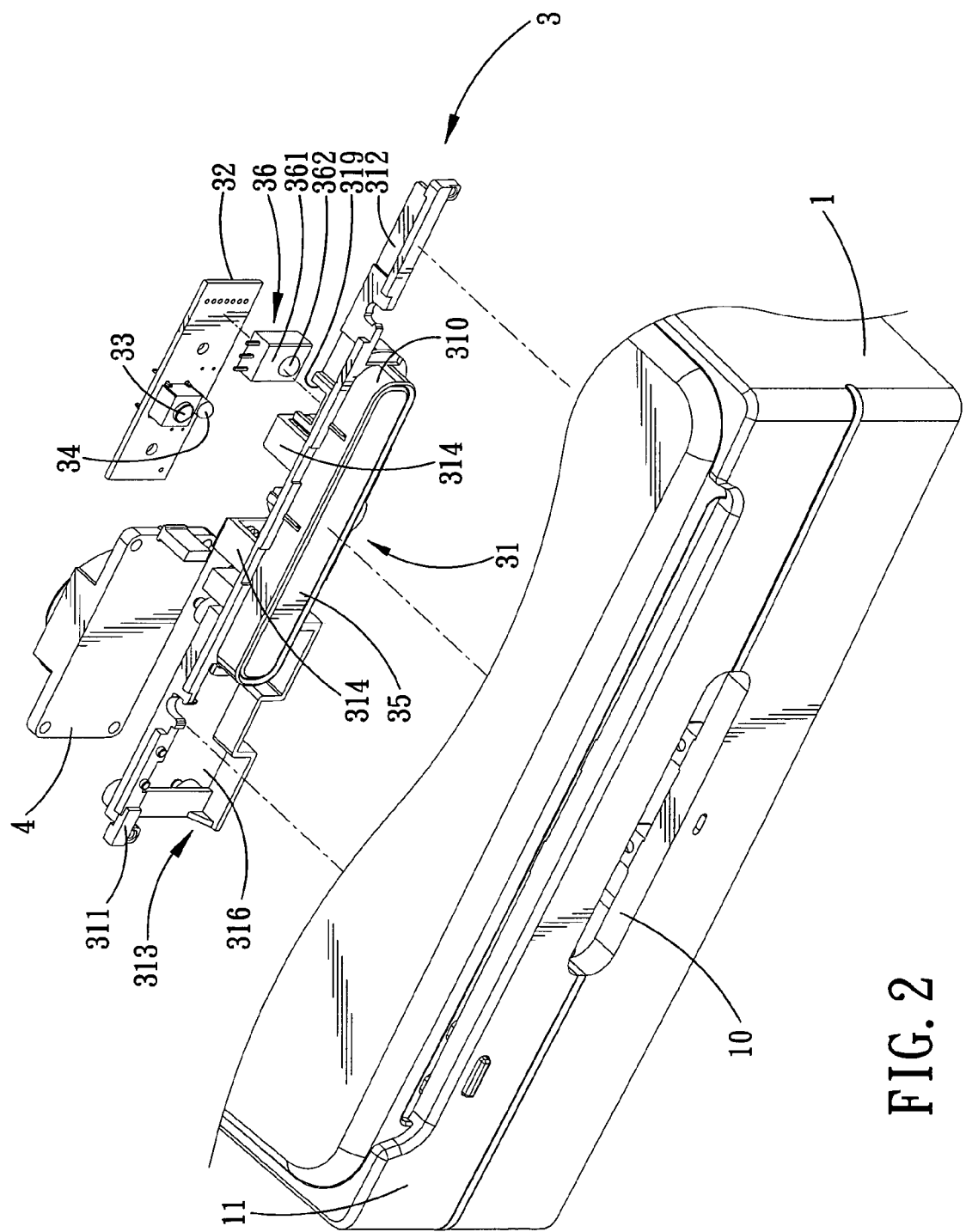
FIG. 2 is an exploded perspective view of an integration switch device of the preferred embodiment.
Figure 3:
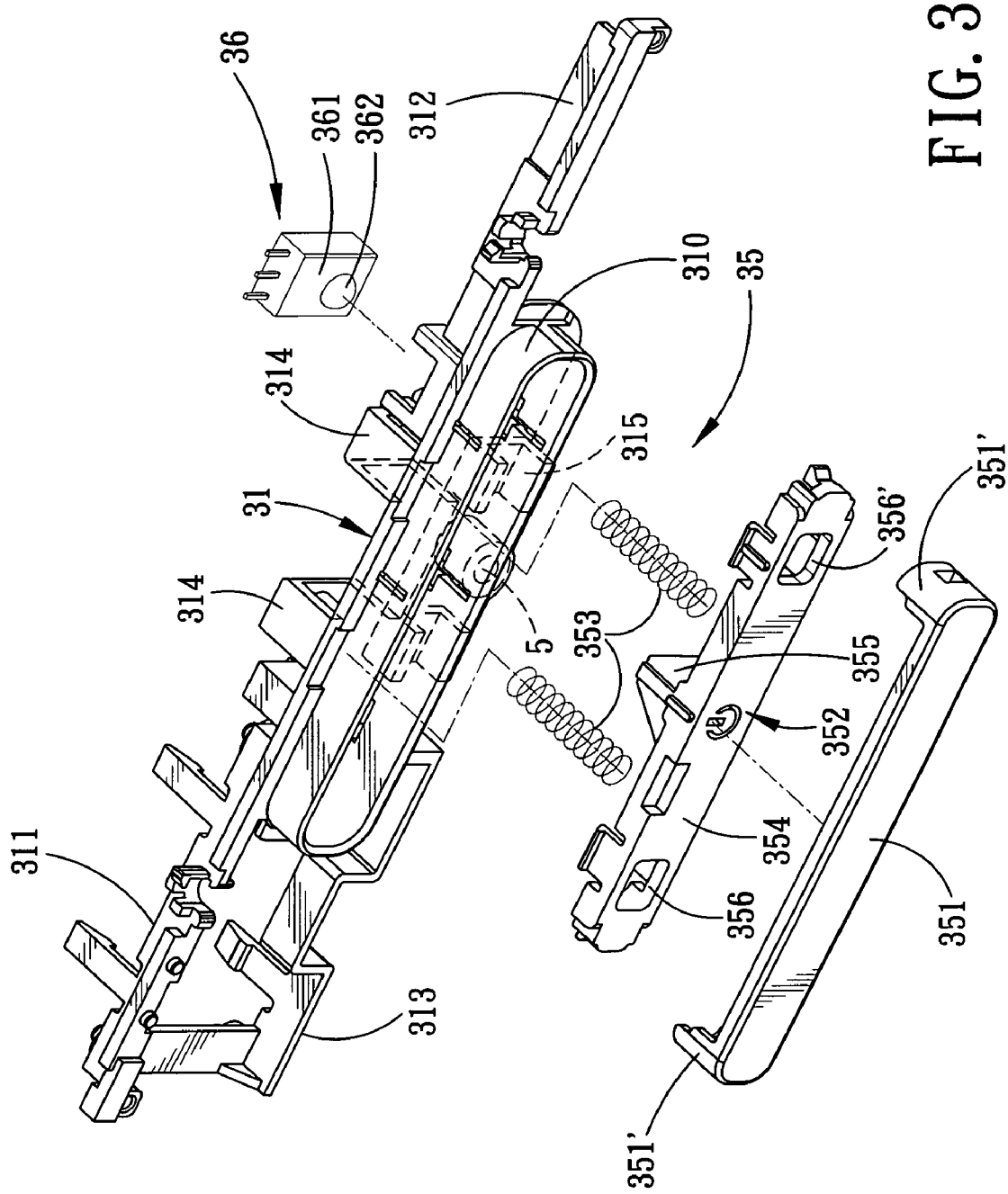
FIG. 3 is a fragmentary, partly exploded perspective view of a base and a pressing unit of the integration type switch of the preferred embodiment.
Figure 4:
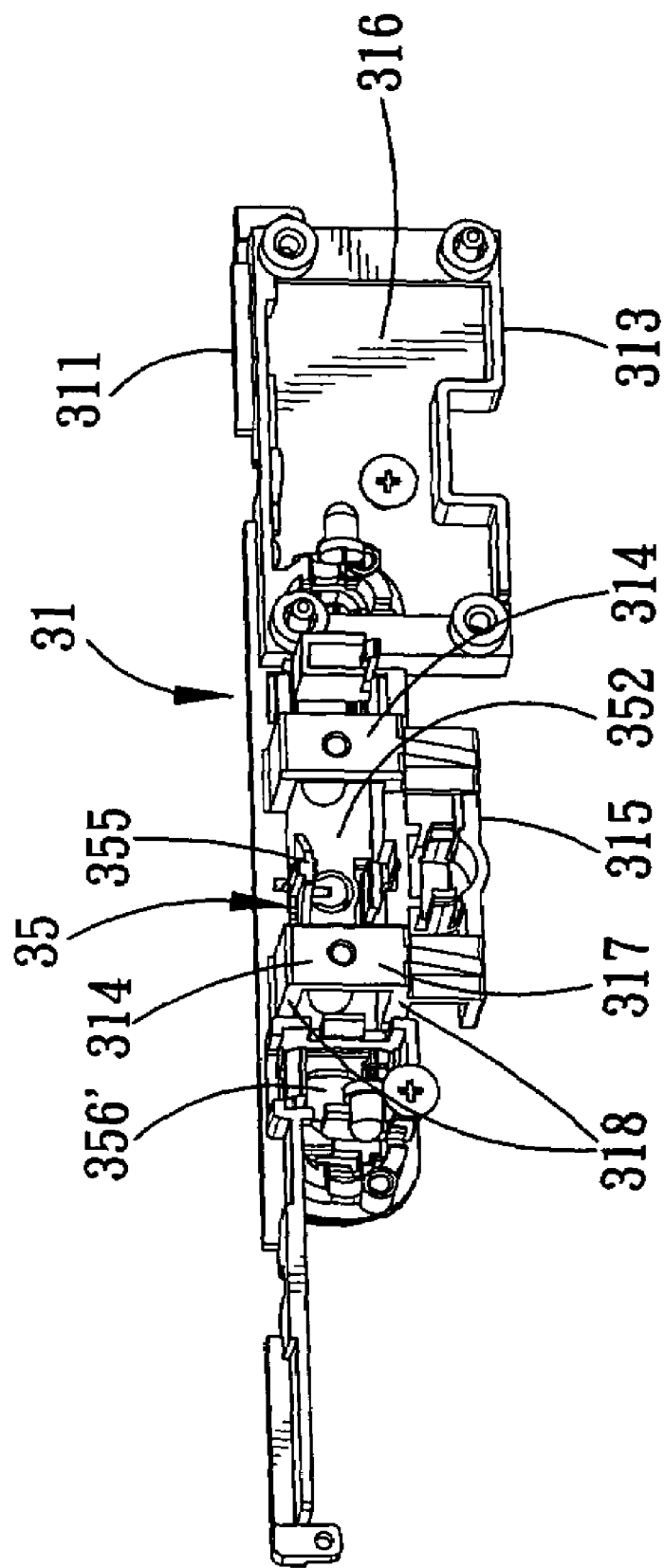
FIG. 4 is a rear perspective view of the base of the preferred embodiment.

Referring to FIGS. 1, 2, and 4, the preferred embodiment of a computer according to this invention includes a main housing 1, a motherboard 2, an integration type switch device 3, a speaker unit 4, and a microphone 5 (see FIG. 3). The main housing 1 is an aluminum extrusion, and has a front wall 11 formed with an oblong mounting hole 10 therethrough. The mounting hole 10 is disposed at a central portion of the front wall 11, and extends along a horizontal direction.

The integration type switch device 3 includes a base 31, an upright power supply circuit board 32, a power supply switch 33, a signal indicating light 34, a pressing unit 35, and an infrared receiver 36. The motherboard 2 is coupled electrically to the power supply circuit board 32 and the infrared receiver 36, as well as to the speaker unit 4, and the microphone 5.

The base 31 is formed by plastic injection molding, is disposed fixedly in the main housing 1, and is aligned with the mounting hole 10 in the main housing 1. The base 31 includes an integral annular surrounding wall 310, a pair of left and right side wings 311, 312, an extension plate 313, two U-shaped positioning brackets 314, and a microphone-mounting member 315. The surrounding wall 310 is disposed fixedly and fittingly within the mounting hole 10 in the main housing 1. The left and right side wings 311, 312 extend respectively, integrally, and laterally from two opposite sides of the surrounding wall 310 away from each other. The extension plate 313 is formed integrally with and disposed under the left side wing 311 to define a speaker-mounting hole 316 therebetween. The positioning brackets 314 are formed integrally and disposed behind the surrounding wall 310. Each of the positioning brackets 314 has a rear wall 317 and two side walls 318 extending respectively and forwardly from opposite upper and lower sides of the rear wall 317. The microphone-mounting member 315 is formed integrally with and disposed under the surrounding wall 310 and the positioning brackets 314. The surrounding wall 310 has a front end that is plated for aesthetic purposes and that has an axial length of about 2 mm.

The power supply circuit board 32 is spaced apart from the mounting hole 10 in the main housing 1, and is disposed fixedly on the rear walls 317 of the positioning brackets 314. The power supply switch 33 and the signal indicating light 34 are disposed on a front side surface of the power supply circuit board 32. The signal indicating light 34 is disposed under the power supply switch 33.

Referring to FIGS. 2, 3, and 4, the pressing unit 35 includes a transparent push plate 351, a transparent actuator plate 352, and a biasing unit consisting of two resilient members 353. The push plate 351 and the actuator plate 352 are movable forwardly and rearwardly within the surrounding wall 310, and are co-movable with each other. The push plate 351 is exposed within the mounting hole 10 in the main housing 1 so as to allow for operation by the user. The actuator plate 352 is disposed behind and abuts against the push plate 351. The push plate 351 is elongated, and is formed with two arms 351' extending respectively, integrally, and rearwardly from two opposite ends thereof. The arms 351' flank the actuator plate 352. As such, the push plate 351 can move the actuator plate 352 rearwardly in the surrounding wall 310. The resilient members 353 bias the actuator plate 352 to move forwardly within the surrounding wall 310.

The actuator plate 352 includes a plate body 354 having a rear side surface formed with a control key 355, and a pair of left and right through holes 356, 356' formed therethrough. Each of the resilient members 353 is configured as a coiled compression spring, and has two ends abutting respectively against the rear wall 317 of the corresponding positioning bracket 314 and the actuator plate 352. When a force is applied to move the actuator plate 352 rearwardly within the surrounding wall 310 from a normal position, the control key 355 comes into contact with and activates the power supply switch 33. Subsequently, upon release of the force, the resilient members 353 return the actuator plate 352 to the normal position.

The push plate 351 and the actuator plate 352 are made of an optical plastic material, and are formed by injection molding.

The infrared receiver 36 is disposed behind the actuator plate 352, and includes a receiver body 361 and a hemispherical transparent light-detecting member 362 disposed on a front side of the receiver body 361 for receiving infrared signals. The receiver body 361 is press-fitted within a U-shaped support 319 that is formed integrally with the surrounding wall 310 and a left end of the right side wing 312 of the base 31. The light-detecting member 362 extends into the right through hole 356' in the actuator plate 352.

The speaker unit 4 is disposed fixedly within the speaker-mounting hole 316 in the base 31. The microphone 5 is attached to the microphone-mounting member 315, and is disposed under the pressing unit 35.

In sum, the computer of this invention has the following advantages:
1. Since the power supply switch 33, the signal indicating light 34, the infrared receiver 36, the speaker unit 4, and the microphone 5 are directly or indirectly mounted to the base 31, the structure of the computer is simple. As a result, the computer is aesthetically pleasing, and can be manufactured with ease.
2. The push plate 351 and the actuator plate 352 are transparent. Hence, it is not necessary for the main housing 1 to be formed with an opening for receiving the signal indicating light 34. Similarly, since infrared signals can be transmitted to the infrared receiver 36 through the push plate 351 and the actuator plate 352, there is no need for an additional opening to be formed through the main housing 1 for transmission of infrared light rays.

Therefore, the objects of this invention can be achieved.

With this invention thus explained, it is apparent that numerous modifications and variations can be made without departing from the scope and spirit of this invention. It is therefore intended that this invention be limited only as indicated by the appended claims.

I claim:
1. A computer comprising:
   a main housing having a front wall formed with a mounting hole therethrough;
   a motherboard; and
   a switch device including
      a base disposed fixedly in said main housing and aligned with said mounting hole in said main housing, said base having a rear side,
      an upright power supply circuit board spaced apart from said mounting hole and disposed fixedly on said rear side of said base, said power supply circuit board being coupled electrically to said motherboard and having a front side surface,
      a power supply switch disposed on said front side surface of said power supply circuit board,
      a pressing unit including a transparent actuator plate movable forwardly and rearwardly within said mounting hole in said main housing, and a biasing unit including at least one resilient member and biasing said actuator plate to move forwardly within said mounting hole in said main housing, said actuator plate having a rear side surface formed with a control key, said control key coming into contact with and activating said power supply switch when a force is applied to move said actuator plate rearwardly within said mounting hole in said main housing from a normal position, after which, upon release of said force, said resilient member returns said actuator plate to said normal position, and
      an infrared receiver disposed fixedly on said rear side of said base of said switch device for receiving infrared signals, said infrared receiver being coupled electrically to said motherboard.

2. The computer as claimed in claim 1, wherein said infrared receiver includes a receiver body having a front side, and a hemispherical light-detecting member disposed on said front side of said receiver body.

3. The computer as claimed in claim 2, wherein said receiver body of said infrared receiver is disposed behind said actuator plate, said actuator plate having a through hole formed therethrough, said light-detecting member of said infrared receiver extending into said through hole in said actuator plate, said pressing unit further including a transparent push plate that is movable forwardly and rearwardly within said mounting hole in said main housing and that is disposed in front of and abuts against said actuator plate, said push plate being co-movable with said actuator plate and being operable to move said actuator plate rearwardly within said mounting hole in said main housing.

4. The computer as claimed in claim 3, wherein said push plate and said actuator plate are made of an optical plastic material, and are formed by injection molding.

5. The computer as claimed in claim 3, wherein said base of said switch device is formed with an integral annular surrounding wall, said surrounding wall being disposed fixedly within said mounting hole in said main housing, said push plate and said actuator plate being disposed within said surrounding wall.

6. The computer as claimed in claim 1, wherein said base being further formed with at least one side wing that extends integrally and laterally from said surrounding wall and that has a rear side.

7. The computer as claimed in claim 6, further comprising a speaker unit disposed fixedly on said rear side of said side wing of said base, said speaker unit being coupled electrically to said motherboard.

8. The computer as claimed in claim 1, wherein said base of said switch device is formed with an integral annular surrounding wall, and two spaced-apart U-shaped positioning brackets formed integrally with and disposed behind said surrounding wall, each of said positioning brackets having a rear wall and two parallel side walls extending respectively from two opposite sides of said rear wall, said power supply circuit board being disposed fixedly on said rear walls of said positioning brackets, said biasing unit further including two said resilient members, each of which is configured as a coiled compression spring and has two ends abutting respectively against said rear wall of a corresponding one of said positioning brackets and said actuator plate.

9. The computer as claimed in claim 1, wherein said switch device further includes a signal indicating light disposed on said front side surface of said power supply circuit board under said power supply switch.

10. The computer as claimed in claim 1, wherein said mounting hole in said main housing is disposed at a central portion of said front wall, is oblong, and extends along a horizontal direction.

11. The computer as claimed in claim 1, further comprising a microphone, said base of said switch device being formed with an integral annular surrounding wall, said surrounding wall being disposed fixedly within said mounting hole in said main housing, said base being further formed with a microphone-mounting member formed integrally with and disposed under said surrounding wall, said microphone being attached to said microphone-mounting member.

* * * * *